(12) United States Patent
Garreau

(10) Patent No.: US 6,769,035 B1
(45) Date of Patent: Jul. 27, 2004

(54) SAME SINGLE BOARD COMPUTER SYSTEM OPERABLE AS A SYSTEM MASTER AND A BUS TARGET

(75) Inventor: Oliver F. Garreau, San Jose, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/545,469

(22) Filed: Apr. 7, 2000

(51) Int. Cl.$^7$ .............................................. G06F 13/00
(52) U.S. Cl. ............................. 710/14; 710/8; 710/107; 710/110
(58) Field of Search ................... 710/8, 10, 14, 710/15, 18, 100, 107, 110, 113, 305, 306, 309, 313, 314, 2, 62–64, 300, 301

(56) References Cited

U.S. PATENT DOCUMENTS

| | | | |
|---|---|---|---|
| 5,278,959 A | 1/1994 | Corcoran et al. | |
| 5,555,425 A | 9/1996 | Zeller et al. | |
| 5,611,057 A | 3/1997 | Pecone et al. | |
| 5,678,018 A | 10/1997 | Chin et al. | |
| 5,724,528 A | 3/1998 | Kulik et al. | |
| 5,742,512 A * | 4/1998 | Edge et al. | 340/687 |
| 5,764,924 A * | 6/1998 | Hong | 710/300 |
| 5,784,581 A * | 7/1998 | Hannah | 710/110 |
| 5,815,674 A | 9/1998 | LaBerge | |
| 5,857,081 A | 1/1999 | Furuta | |
| 5,887,145 A | 3/1999 | Harari et al. | |
| 5,960,213 A | 9/1999 | Wilson | |
| 5,983,300 A | 11/1999 | Kanekal | |
| 5,987,553 A | 11/1999 | Swamy et al. | |
| 6,035,360 A | 3/2000 | Doidge et al. | |
| 6,199,133 B1 * | 3/2001 | Schnell | 710/110 |
| 6,256,692 B1 * | 7/2001 | Yoda et al. | 710/104 |
| 6,279,063 B1 * | 8/2001 | Kawasaki et al. | 710/110 |
| 6,331,852 B1 * | 12/2001 | Gould et al. | 345/419 |
| 6,507,920 B1 * | 1/2003 | Truebenbach | 714/43 |
| 6,549,958 B1 * | 4/2003 | Kuba | 710/14 |
| 6,639,806 B1 * | 10/2003 | Chuang et al. | 361/748 |

FOREIGN PATENT DOCUMENTS

JP          10-301898       * 11/1998

\* cited by examiner

*Primary Examiner*—Ilwoo Park
(74) *Attorney, Agent, or Firm*—Fish & Richardson P.C.

(57) ABSTRACT

A same single board computer system that is operable as a system master and a bus target and methods of operating the same are described. In one system, a processor having a system master mode of operation and a bus target mode of operation is mounted on a printed circuit board. An expansion board connector is coupled to the processor and is configured to couple to an expansion board. A system master connector also is coupled to the processor and is configured to couple to an expansion board connector of a system master board. In a method of operating the above-described system, the processor is configured as a system master or a bus target in response to a received mode control signal, and a target bus or a system master bus is selectively enabled in response to the received mode control signal.

12 Claims, 3 Drawing Sheets

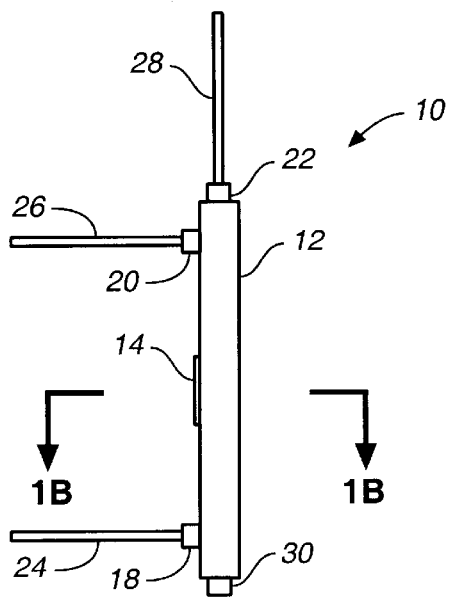
FIG._1A
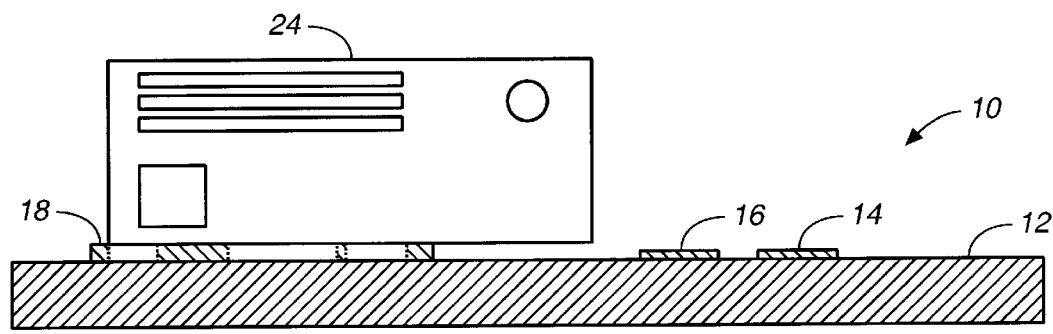
FIG._1B
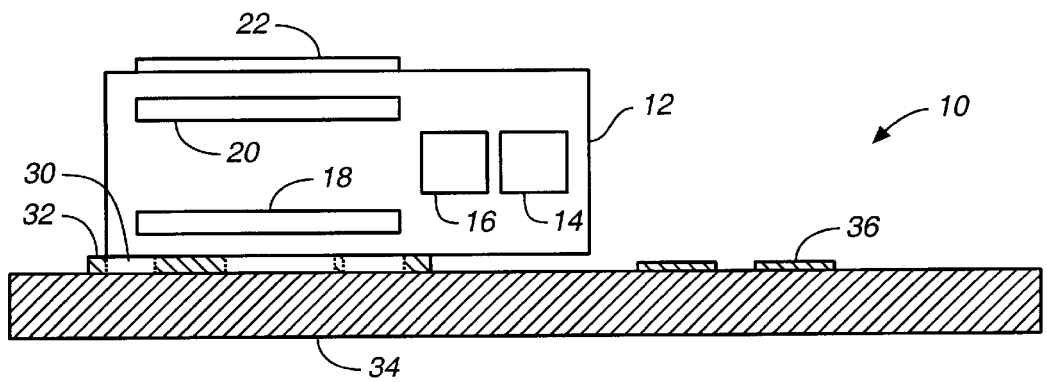
FIG._2

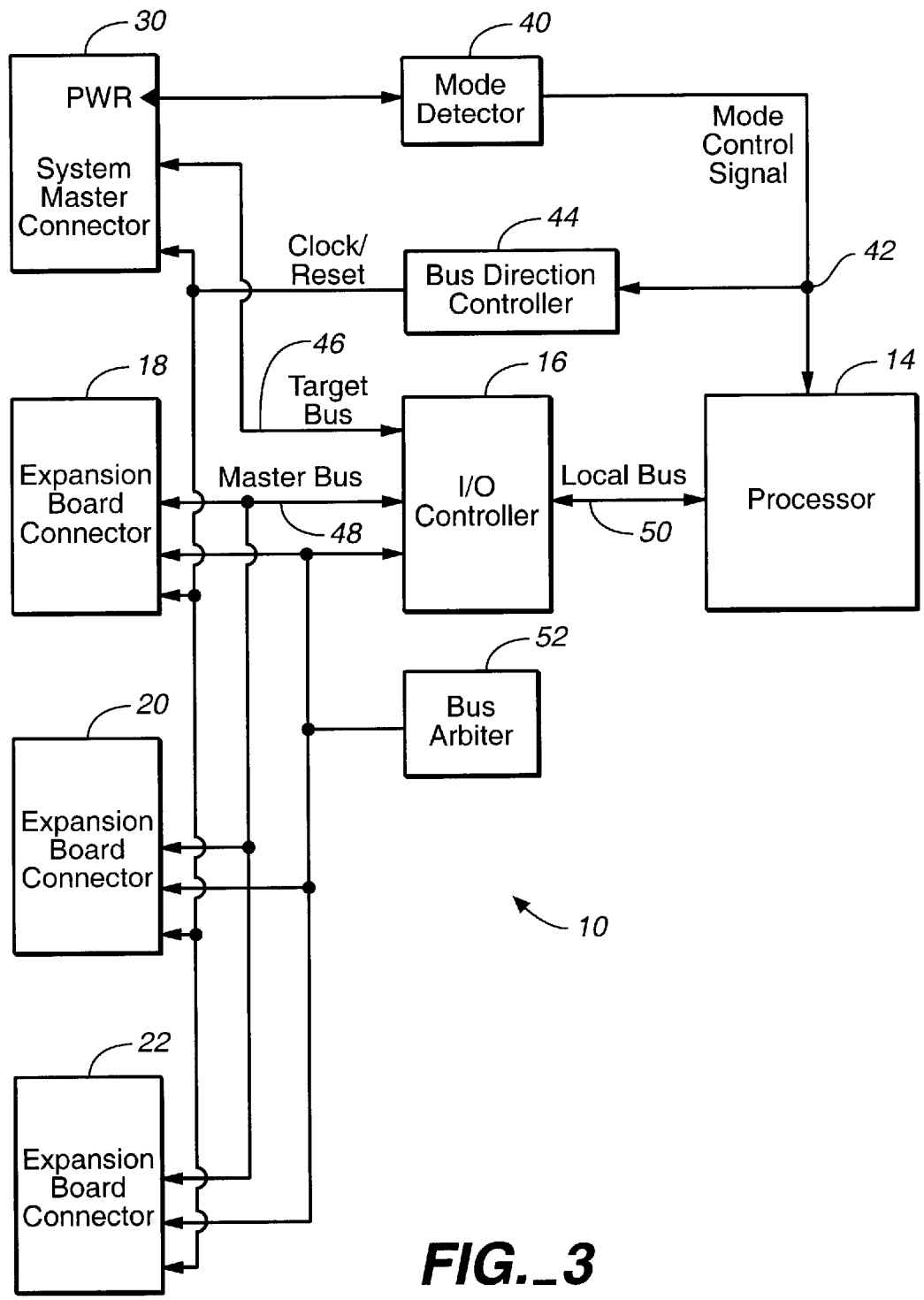
FIG._3

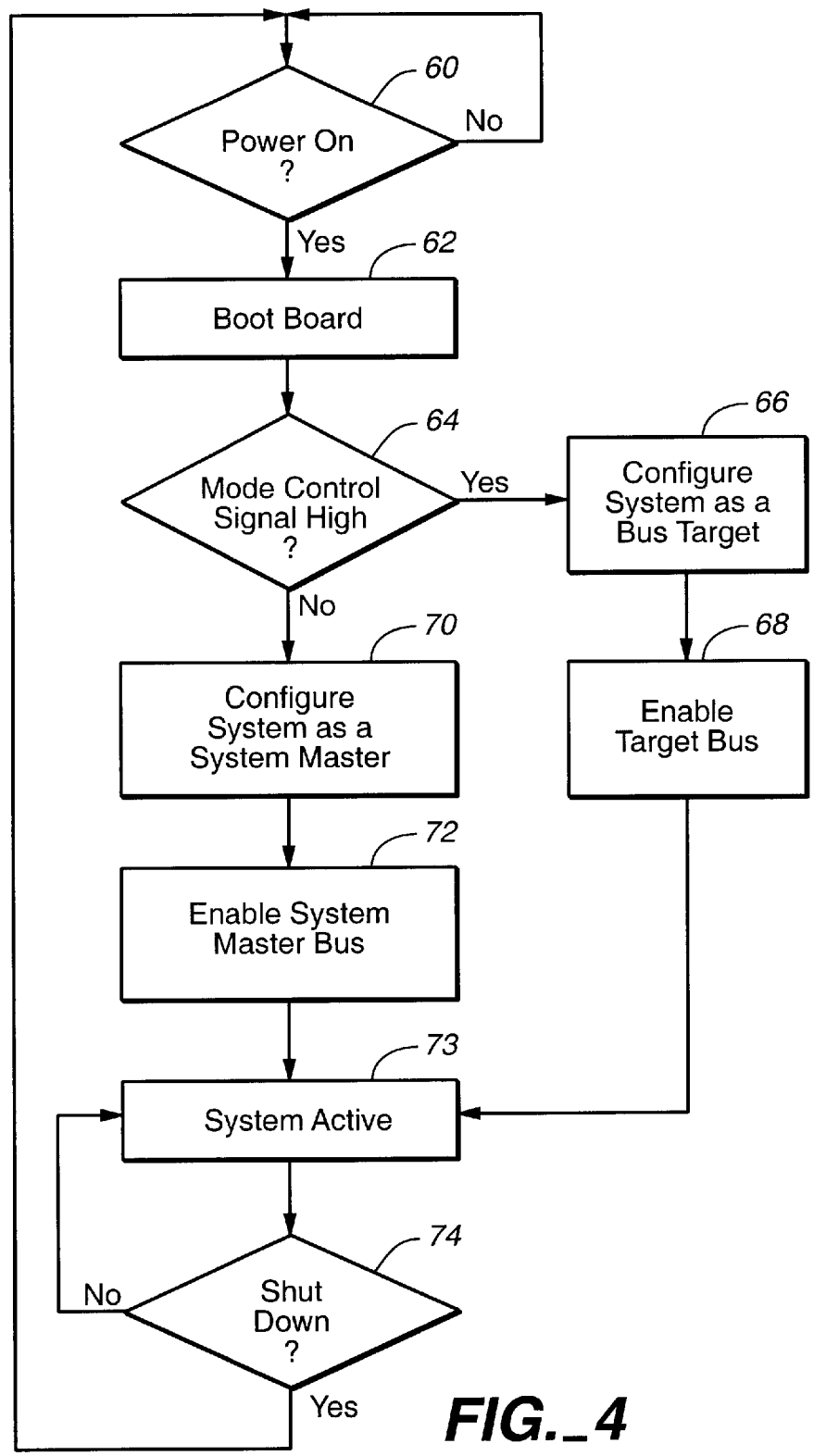
FIG._4

SAME SINGLE BOARD COMPUTER SYSTEM OPERABLE AS A SYSTEM MASTER AND A BUS TARGET

TECHNICAL FIELD

This invention relates to a unique single board computer system operable as a system master and a bus target and methods of operating the same.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

A typical computer system includes a central processing unit (CPU) (or host processor), memory and an input/output (I/O) controller. These modules are mounted on a printed circuit board and are connected together by buses. Buses are shared communication channels that carry information between the components of the computer system. The signals that are carried by a bus may include address signals, data signals, clock signals and other control signals. Standard system buses, such as the AT bus, the Peripheral Component Interconnect (PCI) bus, the Small Computer System Interface (SCSI) bus, the Industry Standard Architecture (ISA) and the Extended ISA (EISA) bus, are used to transmit data between the different boards of a computer system, including a motherboard and one or more expansion boards. The motherboard is the main circuit board of a computer system. A motherboard typically contains connectors for attaching additional boards (e.g., expansion boards or daughter boards) to the system, and typically includes a system master. The system master manages and controls the system configuration. The system master controls the configuration of all of the system resources and is the only component in the system that has knowledge of the bus topology and the address transmission mechanisms. The system master and one or more bus controllers (or bus masters) emit address and control signals to the system buses. A separate bus arbiter arbitrates for control of the system bus. A bus master is a device (e.g., a processor) that takes control of a system bus to initiate a transaction after being granted access to the bus by the arbiter; a device at the other end of the transaction is referred to as a bus target. The information transferred in bus transactions between bus masters and bus targets include data, address information, commands, byte enables and device identification information.

SUMMARY

The invention features a single board computer system operable indifferently as a system master, and a bus target and methods of operating the same.

In one aspect, the invention features a system comprising a processor mounted on a printed circuit board and having a system master mode of operation and a bus target mode of operation. An expansion board connector is coupled to the processor and is configured to couple to an expansion board. A system master connector also is coupled to the processor and is configured to couple to an expansion board connector of a system master board.

Embodiments may include one or more of the following features.

A mode detector preferably is coupled to the processor and is configured to generate a mode control signal for controlling the operating mode of the processor. The mode detector preferably is configured to determine whether the system is coupled to an expansion board or a system master board. In one embodiment, the mode detector is coupled to the system master connector and is configured to produce a mode control signal based upon a signal at a terminal of the system master connector. In this embodiment, the mode detector is configured to produce a bus target mode control signal if a power terminal of the system master connector is active, and is configured to produce a system master mode control signal if a power terminal of the system master connector is inactive.

The system may include a bus controller configured to enable a master bus in a system master mode of operation and to enable a target bus in a bus target mode of operation. The bus controller preferably is configured to generate a master clock signal in the system master mode of operation and to disable a master clock signal in the bus target mode of operation. The bus controller may be configured to reset a bus target in the system master mode of operation.

An input/output (I/O) controller may be mounted on the printed circuit board. The I/O controller preferably is operable to interface the processor to a system master bus in a system master mode of operation and to interface the processor to a target bus in a bus target mode of operation.

In one embodiment, a second expansion board connector is coupled to the processor and is configured to couple to a second expansion board. The system may include a bus arbiter configured to grant bus access to a bus master by arbitrating between bus requests received from the first and second expansion boards.

The expansion board connector and the system master connector preferably are compliant with a bus protocol that supports bus masters and bus targets. In one embodiment, the expansion board connector and the system master connector are compliant with a Peripheral Component Interconnect (PCI) bus protocol.

In another aspect, the invention features a method of operating the above-described system. In accordance with this inventive method a processor is configured as a system master or a bus target in response to a received mode control signal, and a target bus or a system master bus is selectively enabled in response to the received mode control signal.

A mode control signal may be generated based upon a connector terminal signal at a terminal of a connector. The connector terminal signal may be detected at a power terminal of a system master connector. A master bus may be enabled by enabling a master clock signal and a bus target reset signal.

Among the advantages of the invention are the following.

The invention provides a single board computer system with a universal board architecture that enables the system to be used flexibly as either a bus target or a system master. The invention is particularly advantageous when implemented as an evaluation board. For example, the bus target mode of operation enables designers to write software code on a conventional computer system and readily test and debug the operation of the software code on a target processor incorporated into the inventive single board computer system. The system master mode of operation enables designers to incorporate the target processor into a prototype computer system that includes the added functionality of one or more expansion boards. In sum, the invention enables designers to quickly and easily test and debug prototype computer systems with a single board, avoiding the additional time and expense that otherwise would be entailed if two separate boards were used. Furthermore, the invention reduces the costs and efforts needed to develop, maintain and support the two modes of operation provided by the invention.

Other features and advantages of the invention will become apparent from the following description, including the drawings and the claims.

DESCRIPTION OF DRAWINGS

FIG. 1A is a diagrammatic side view of three expansion boards plugged into a single board computer system operating as a system master FIG. 1B is a diagrammatic cross-sectional side view of the single board computer system of FIG. 1A taken along the line 1B—1B.

FIG. 2 is a diagrammatic cross-sectional side view of the single board computer system of FIG. 1A plugged into a system master motherboard and operating as a bus target.

FIG. 3 is a block diagram of components of the single board computer system of FIG. 1A.

FIG. 4 is a flow diagram of a method of operating the single board computer system of FIG. 1A.

DETAILED DESCRIPTION

Referring to FIGS. 1A, 1B and 2, a single board computer system 10 includes a printed circuit board 12 on which is mounted a processor 14, an input/output (I/O) controller 16, and three expansion board connectors 18, 20, 22, which are configured to receive respective expansion boards 24, 26, 28. Single board computer system 10 also includes a system master connector 30 for coupling to an expansion board connector 32 of a system master board 34. In one embodiment, connectors 18–22 and 30 are Peripheral Component Interconnect (PCI) connectors. In particular, connectors 18–22 are configured as PCI bus slots, and connector 30 is configured as a PCI compliant gold finger edge connector that may be inserted into a PCI bus slot of system master board 34. In this embodiment, single board computer system 10 is mechanically and electrically compliant with a PCI bus standard. The form factor of printed circuit board 12 may be compliant with PCI 2.2 mechanical specifications, and the connectors 18–30 may be compliant with PCI 2.2 electrical specifications. A power input and power control circuitry are mounted on printed circuit board 12. Single board computer system 10 also includes an external mounting bracket (not shown) for mounting single board computer system 10 inside an expansion slot of the chassis containing system master board 34.

Single board computer system 10 is programmed to automatically configure itself as either a system master or a bus target, depending upon a user's present needs. In a system master mode of operation (FIGS. 1A and 1B), single board computer 10 is operable as a motherboard (i.e., the main circuit board of a microcomputer). In this mode of operation, processor 14 manages and controls the system configuration, and may be programmed to run software applications and control one or more peripheral devices. In addition, expansion boards 24–28 may be plugged into expansion board connectors 18–22 to provide additional functionality to the system. In a bus target mode of operation (FIG. 2), single board computer 10 is plugged into the expansion board connector 32 of system master board 34. In this mode of operation, a central processing unit 36 on system master board 34 manages and controls the configuration of the overall system, and single board computer 10 functions as an expansion board.

Referring to FIG. 3, single board computer system 10 includes a mode detector 40, which is coupled to processor 14 and is configured to generate a mode control signal 42 for controlling the operating mode of processor 14. In one embodiment, mode detector 40 is coupled to a power terminal of system master connector 30 and is configured to produce a mode control signal 42 that is indicative of whether power is being supplied by system master board 34 through system master connector 30. If the power terminal is active (i.e., mode control signal 42 is high), processor 14 configures itself and I/O controller 16 as a bus target; otherwise, processor 14 configures itself and I/O controller 16 as a system master. The mode control signal 42 also is received by a bus direction controller 44, which is configured to enable a target bus 46 or a master bus 48, depending upon the value of mode control signal 42. If mode control signal 42 is high (i.e., a bus target mode control signal), bus direction controller 44 enables target bus 46 by disabling the master clock and reset signals. If mode control signal 42 is low (i.e., a system master mode control signal), bus controller 44 enables master bus 48 by enabling the clock and reset signals for master bus 48. I/O controller 16 interfaces processor 14 to target bus 46 in the target bus mode of operation, and interfaces processor 14 to master bus 48 in the system master mode of operation. Processor 14 is coupled to I/O controller 16 through a local bus 50. In general, processor 14 and external devices, which are coupled to the system through connectors 18–22, may take turns controlling master bus 48 to carry out transactions. A bus arbiter 52 grants access to master bus 48 by arbitrating between bus requests received from the bus masters connected to master bus 48. Each bus request includes a transaction (e.g., read or write) that may be transmitted on local bus 50. Each transaction includes an identification of the type of action to be performed, the address to which the action is directed and the data to be read or written.

Referring to FIG. 4, in one embodiment, single board computer system 10 may operates as follows. When power is first supplied (step 60), single board computer system 10 boots up and processor 14 loads an initial software application (e.g., an operating system) (step 62). If mode control signal 42 is high (step 64), processor 14 configures itself and I/O controller 16 as a bus target (step 66), and bus controller 44 enables target bus 46 (step 68). If mode control signal 42 is low (step 64), processor 14 configures itself and I/O controller 16 as a system master (step 70), and bus direction controller 44 enables master bus 48 (step 72). Single board computer system remains in the current mode of operation (step 73) until power is shut down (step 74).

In one embodiment, bus direction controller 44 (FIG. 3) is a programmable logic device (e.g., a M4A3-32/32-VC PLD available from Vantis Corporation) that is programmed to enable target bus 46 or master bus 48 in response to the received mode control signal 42. A VHDL (VLSI Hardware Description Language—IEEE 1164) model of the bus direction controller logic is contained in the attached Appendix.

Other embodiments are within the scope of the claims. For example, although the above embodiments were described as being compliant with the PCI bus protocol, other embodiments may be configured to comply with other personal computer bus system or embedded system communication bus protocols (e.g., ISA, PCMCIA, PCI-X, and USB). Furthermore, single board computer system 10 may include one or more expansion board connectors; the three expansion board connectors 18–22 in single board computer system 10 is intended to be merely illustrative of one possible embodiment.

Appendix

VHDL Model for Bus Direction Controller

```
LIBRARY metamor;
USE metamor.attributes.ALL;
LIBRARY ieee;
USE ieee.std_logic_1164.ALL;
USE ieee.numeric_std.ALL;

ENTITY decoder IS PORT (
    -- definition of input signals
    rstoutn,pci_slave,cs3n,cs2n,por_ocds,cs_sdram: IN std_logic;
    csemun,coden,rdn,wrn,cs0n,ta22,ta23,usc_waitn: IN std_logic;
    -- definition of output signals
    ext_por3n,en_nv_mem,cs_rtc,cs_disc,cs_boot,
    cs_ion: OUT std_logic;
    bsn,p03,oe_pclk,waitn,prst,dma: OUT std_logic;
    -- definition of HZ signals
    por3n: INOUT std_logic;
    -- definition of clock signals
    ebuclk,pclk: IN std_logic;
    -- definition of non-connected signals
    cs1n,ioc0,ioc1,csfpin,pll2sel: IN std_logic
);
ATTRIBUTE pinnum : string; -- Must define the attribute
ATTRIBUTE pinnum OF csfpin      :SIGNAL IS "1";
ATTRIBUTE pinnum OF pci_slave   :SIGNAL IS "2";
ATTRIBUTE pinnum OF rstoutn     :SIGNAL IS "3";
ATTRIBUTE pinnum OF ebuclk      :SIGNAL IS "5";
ATTRIBUTE pinnum OF prst        :SIGNAL IS "8";
ATTRIBUTE pinnum OF por3n       :SIGNAL IS "9";
ATTRIBUTE pinnum OF oe_pclk     :SIGNAL IS "10";
ATTRIBUTE pinnum OF cs1n        :SIGNAL IS "11";
ATTRIBUTE pinnum OF p03         :SIGNAL IS "12";
ATTRIBUTE pinnum OF ioc0        :SIGNAL IS "13";
ATTRIBUTE pinnum OF bsn         :SIGNAL IS "14";
ATTRIBUTE pinnum OF usc_waitn   :SIGNAL IS "15";
ATTRIBUTE pinnum OF dma         :SIGNAL IS "18";
ATTRIBUTE pinnum OF por_ocds    :SIGNAL IS "19";
ATTRIBUTE pinnum OF en_nv_mem   :SIGNAL IS "20";
ATTRIBUTE pinnum OF cs_rtc      :SIGNAL IS "21";
ATTRIBUTE pinnum OF cs_disc     :SIGNAL IS "22";
ATTRIBUTE pinnum OF cs_boot     :SIGNAL IS "23";
ATTRIBUTE pinnum OF pll2sel     :SIGNAL IS "24";
ATTRIBUTE pinnum OF waitn       :SIGNAL IS "25";
ATTRIBUTE pinnum OF pclk        :SIGNAL IS "27";
ATTRIBUTE pinnum OF ioc1        :SIGNAL IS "30";
ATTRIBUTE pinnum OF csemun      :SIGNAL IS "31";
ATTRIBUTE pinnum OF coden       :SIGNAL IS "32";
ATTRIBUTE pinnum OF rdn         :SIGNAL IS "33";
ATTRIBUTE pinnum OF wrn         :SIGNAL IS "34";
ATTRIBUTE pinnum OF cs0n        :SIGNAL IS "35";
ATTRIBUTE pinnum OF ta22        :SIGNAL IS "36";
ATTRIBUTE pinnum OF ta23        :SIGNAL IS "37";
ATTRIBUTE pinnum OF cs2n        :SIGNAL IS "40";
ATTRIBUTE pinnum OF ext_por3n   :SIGNAL IS "41";
ATTRIBUTE pinnum OF cs_sdram    :SIGNAL IS "42";
ATTRIBUTE pinnum OF cs3n        :SIGNAL IS "43";
ATTRIBUTE pinnum OF cs_ion      :SIGNAL IS "44";
END decoder;
ARCHITECTURE arch_decoder OF decoder IS
    signal io,csn: std_logic;
    TYPE bs_states IS (idle,cycle1,cyclen);
    SIGNAL bs_cycle: bs_states;
BEGIN
    dma < = '1';                 -- generate a pull-up for the V320
    io < = (rdn AND wrn) OR cs0n; -- transaction to 8-bit
resources (0xA.......space)
    oe_pclk < = NOT pci_slave; -- PCI_SLAVE = 1 :
slave mode, master mode otherwise
                                 -- generate PCI master clock
    (or disable in slave mode)
    p03 < = '0' WHEN pci_slave = '0' ELSE 'Z'; -- inform
processor of PCI mode
    en_nv_mem < = io; -- enable buffer for 8-bit transaction on CS0# or
CSEMU
    cs_boot < = '0' WHEN (io = '0' AND ta22 = '0'
    AND ta23 = '0' AND por3n = '1') ELSE '1'; -- 0xA0000000
    cs_rtc < = '0' WHEN (io = '0' AND ta22 = '1'
    AND ta23 = '0' AND por3n = '1') ELSE '1'; -- 0xA0400000
    cs_disc < = '0' WHEN (io = '0' AND ta22 = '0'
    AND ta23 = '1' AND por3n = '1') ELSE '1'; -- 0xA0800000
    cs_ion < = '1' WHEN (io = '0' AND ta22='1' AND ta23 = '1' AND
    por3n = '1') ELSE '0'; -- 0xA0C00000
    waitn < = usc_waitn when cs2n = '0' ELSE 'Z';
    generate_POR3n: PROCESS (pci_slave, rstoutn, por_ocds)
    BEGIN
        IF pci_slave = '1' AND rstoutn = '0' THEN -- reset
coming from PCI controller
            por3n < = '0';
        ELSIF por_ocds = '0' THEN -- reset coming from tools or extension
            por3n <= '0';
        ELSE
            por3n < = 'Z';       -- reset coming from POR controller
    (Open Drain)
        END IF;
    END PROCESS generate_POR3n;
    prst < = '0' WHEN (pci_slave = '0' AND por3n = '0' )
    ELSE 'Z' ; -- reset PCI target while in master
    ext_por3n < = '0' WHEN por3n = '0' ELSE 'Z'; -- reset the
LCD display
    csn < = (rdn AND wrn) OR cs2n; -- PCI transaction
    bs_state_machine: PROCESS (ebuclk,por3n,csn)
    BEGIN
        IF por3n = '0' THEN
            bs_cycle < = idle;
        ELSIF falling_edge(ebuclk) THEN
            CASE bs_cycle IS
                WHEN idle = >   IF csn = '0' THEN bs_cycle < =
cycle1;
                                    ELSE bs_cycle < = idle;
                                    END IF;
                WHEN cycle1 = > IF csn = '0' THEN bs_cycle < =
cyclen;
                                    ELSE bs_cycle < = idle;
                                    END IF;
                WHEN cyclen => IF csn = '0' THEN bs_cycle < =
cyclen;
                                    ELSE bs_cycle < = idle;
                                    END IF;
                WHEN OTHERS = > bs_cycle < = idle;
            END CASE;
        END IF;
    END PROCESS bs_state_machine;
    bsn < = '0' WHEN bs_cycle = cycle1 ELSE '1';
END arch_decoder;
```

What is claimed is:

1. A system, comprising a printed circuit board;

a processor mounted on the printed circuit board having a system master mode of operation and a bus target mode of operation, wherein the printed circuit board operates as a motherboard in the system master mode and as an expansion board in the bus target mode;

a system master bus coupled to the processor;

an expansion board connector on the printed circuit board, coupled to the system master bus, and configured to mount an expansion board to the printed circuit board;

a target bus coupled to the processor;

a system master connector on the printed circuit board, the system master connector being coupled to the target bus and configured to mount the printed circuit board to an expansion board connector of a system master board, wherein the system master connector includes a power terminal to supply power by the system master board;

a bus direction controller configured to generate a master clock signal in the system master mode of operation, and to enable the system master bus in the system master mode of operation and the target bus in the bus target mode of operation;

a power input mounted on the printed circuit board; and a mode detector coupled to the power terminal of the system master connector to generate a mode control signal depending on whether power is supplied at the power terminal, the mode control signal being received by the processor to configure the printed circuit board in the system master mode of operation if power is not supplied at the power terminal and in the bus target mode of operation if power is supplied at the power terminal.

2. The system of claim 1, wherein the bus direction controller is configured to disable the master clock signal in the bus target mode of operation.

3. The system of claim 1, wherein the bus direction controller is configured to reset a bus target in the system master mode of operation.

4. The system of claim 1, further comprising an input/output controller mounted on the printed circuit board and operable to interface the processor to the system master bus in the system master mode of operation and to interface the processor to the target bus in the bus target mode of operation.

5. The system of claim 1, further comprising a second expansion board connector on the printed circuit board, coupled to the system master bus, and configured to mount a second expansion board to the printed circuit board.

6. The system of claim 5, further comprising one or more additional expansion board connectors on the circuit board, each of the one on more additional expansion board connectors being coupled to the system master bus, and configured to mount an additional expansion board to the printed circuit board.

7. The system of claim 1, wherein the expansion board connector and the system master connector are compliant with a bus protocol that supports bus masters and bus targets.

8. The system of claim 1, wherein the expansion board connector and the system master connector are compliant with a Peripheral Component Interconnect (PCI) bus protocol.

9. The system of claim 1, wherein the bus direction controller receives the mode control signal.

10. A method, comprising:

generating a mode control signal depending on whether power is supplied at a power terminal of a system master connector on a printed circuit board, the system master connector being configured to mount the printed circuit board to an expansion board connector of a system master board;

receiving the mode control signal in a processor mounted on the printed circuit board;

configuring the processor as a system master if power is not supplied at the power terminal or a bus target if power is supplied at the power terminal based on the mode control signal; and selectively enabling a target bus or a system master bus based on the mode control signal, wherein enabling the system master bus comprises enabling a master clock signal, and wherein the target bus couples the processor to the system master connector on the printed circuit board, and the system master bus couples the processor to an expansion board connector on the printed circuit board, the expansion board connector being configured to mount an expansion board to the printed circuit board.

11. The method of claim 10, wherein enabling the system master bus comprises enabling a bus target reset signal.

12. The method of claim 10, wherein:

selectively enabling a target bus or a system master bus includes receiving the mode control signal in a bus controller.

* * * * *

UNITED STATES PATENT AND TRADEMARK OFFICE
CERTIFICATE OF CORRECTION

PATENT NO. : 6,769,035 B1
DATED : July 27, 2004
INVENTOR(S) : Oliver F. Garreau

It is certified that error appears in the above-identified patent and that said Letters Patent is hereby corrected as shown below:

Column 7,
Line 38, replace "each of the one on more additional expansion board con-" with
-- each of the one or more additional expansion board con- --

Signed and Sealed this

Twelfth Day of April, 2005

JON W. DUDAS
*Director of the United States Patent and Trademark Office*